2,894,006
Patented July 7, 1959

2,894,006
TESTOSTERONE-2'-ACETOXY-4'-METHYL-PENTANOATE

Douglas S. Irvine, Montreal, Quebec, and Roger Gaudry, Mount Royal, Quebec, Canada, assignors to American Home Products Corporation, New York, N.Y., a corporation of Delaware No Drawing. Application June 26, 1958
Serial No. 744,667

6 Claims. (Cl. 260—397.4)

This invention relates to a new cyclopentanophenanthrene derivative and to its preparation.

More particularly, our invention relates to a long-acting androgen, testosterone 2'-acetoxy-4'-methyl-pentanoate, and to the method by which this new chemical compound may be readily prepared from available starting materials.

Our new chemical compound, an ester of testosterone with *l*-2-acetoxy-4-methyl-pentanoic acid, has long acting androgenic activity as well as myotrophic activity, being in these respects comparable with known testosterone androgenic compounds such as the ananthate and propionate esters.

Testosterone is now therapeutically utilized in the form of its esters to achieve more prolonged action. In stability and duration of its activity, the new long-acting ester of testosterone compares favorably with the testosterone esters which are now utilized in medicine.

Our new long-acting androgen may be prepared by esterifying testosterone 2'-hydroxy-4'-methyl-pentanoate with an acetylating agent such as acetic anhydride. The starting material, testosterone 2'-hydroxy-4'-methyl-pentanoate, which is an ester of testosterone with *l*-2-hydroxy-4-methyl-pentanoic acid (*l*-leucic acid) may be readily prepared by treating testosterone with this acid, and a suitable catalyst, such as, e.g., p-toluene-sulfonic acid.

In carrying out the acetylation, acetic anhydride may be directly added to a solution of testosterone 2'-hydroxy-4'-methyl-pentanoate in an inert solution. It is generally preferable to carry out the esterification in the presence of an acid acceptor. When pyridine is utilized as the acid acceptor no inert solvent is necessary, as the reactants readily dissolve in an excess thereof.

Recovery of testosterone 2'-acetoxy-4'-methyl - pentanoate from the reaction mixture is readily effected by extracting the desired compound with an extractant such as ether. After washing to substantial neutrality, the desired compound may be recovered by evaporating off the ether.

The process by which testosterone 2'-acetoxy-4'-methyl-pentanoate may be prepared may be represented as follows:

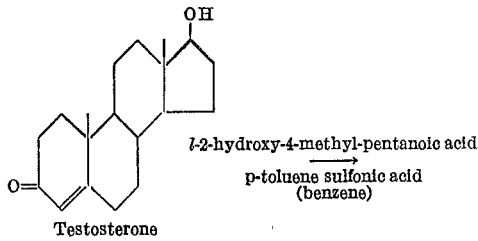

Testosterone

*l*-2-hydroxy-4-methyl-pentanoic acid
⟶
p-toluene sulfonic acid
(benzene)

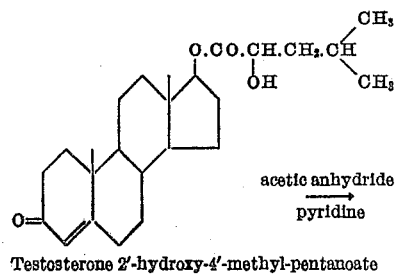

Testosterone 2'-hydroxy-4'-methyl-pentanoate acetic anhydride
⟶
pyridine

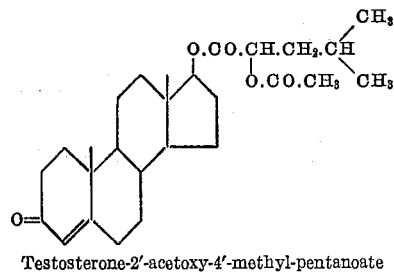

Testosterone-2'-acetoxy-4'-methyl-pentanoate

In comparative studies carried out wherein the androgens were injected subcutaneously into castrated 21-day old albino rats, in the conventional test procedure, and the animals sacrificed at the conclusion of the test period and their organs (thymus, thyroids, adrenals, pituitary, spleen, heart, liver, kidneys, sphincter ani, levator ani, seminal visicles, ventral prostate, and cowper glands) removed and weighed, the myotrophic and androgenic activity of the new testosterone ester, as compared with that of other testosterone esters, was experimentally demonstrated.

The following specific examples serve to illustrate the invention and to give further details of the process by which the new androgen may be prepared, but they are to be regarded as illustrative rather than limiting.

Example 1

28.6 grams of testosterone, 21.5 grams of *l*-2-hydroxy-4-methyl-pentanoic acid (*l*-leucic acid), and 2.86 grams of p-toluene sulfonic acid were dissolved in 500 milliliters of dry benzene. The solution was then refluxed for four hours with constant removal of moist benzene. The volume of reaction mixture was maintained substantially constant by the addition of dry benzene, as required.

The solution was allowed to stand overnight at room temperature, whereupon it was diluted with ether and washed with water. The benzene-ether solution was then washed; first with 2 N sodium hydroxide solution; and then with 3 N hydrochloric acid; and finally with water, until it was substantially neutral in reaction.

Evaporation of the dried solution gave 41.0 grams of a yellow gum. This gum was then dissolved in a mixture comprising equal parts of n-hexane and benzene. The solution was percolated through a column containing 1200 grams of activated alumina. Elution of the column with a mixture comprising 19 parts of benzene and 1 part of methanol, by volume, resulted in a fraction which crystallized from mixed acetone-petroleum ether (B.P., 30–60° C.). This product was testosterone 2'-hydroxy-4'-methyl-pentanoate. 11.28 grams of the product in the form of flattened needles, melting point 139–140° C., was recovered. Specific rotation, $(\alpha)_D$ +74.5° (C, 1.9 in ethanol).

The empiric formula of the product, $C_{25}H_{38}O_4$, was confirmed by analysis.

Required: C, 74.63; H, 9.44. Found: C, 74.96; H, 9.69.

*Example 2*

3.5 grams of testosterone 2'-hydroxy-4'-methyl pentanoate, as prepared above, was dissolved in 20 milliliters of pyridine. Ten milliliters of acetic anhydride was then added and the solution was allowed to stand overnight at room temperature. It was then diluted by the addition of water and extracted with ether. The extract was then washed; first with 3 N hydrochloric acid; and then with water until substantially neutral in reaction. Evaporation of the dried solution gave a partly crystalline residue which separated from methanol-water in the form of robust blades. 3.35 grams of this crystalline product, testosterone 2'-acetoxy-4'-methyl-pentanoate were recovered. The compound melted at 106–108° C. and had the specific rotation $(\alpha)_D$ +42° (C, 1.0 in ethanol).

Analysis confirmed the empiric formula $C_{27}H_{40}O_5$.

Required: C, 72.97; H, 9.01. Found: C, 72.98; H, 9.06.

We claim:

1. Testosterone 2'-acetoxy-4'-methyl-pentanoate.
2. The process of preparing a long-acting androgen which comprises acetylating testosterone 2'-hydroxy-4'-methyl-pentanoate.
3. The process of preparing a long-acting androgen which comprises acetylating testosterone 2'-hydroxy-4'-methyl-pentanoate by treating said compound with an acetylating agent in the presence of an acid acceptor.
4. The process of preparing testosterone 2'-acetoxy-4'-methyl-pentanoate which comprises acetylating testosterone 2'-hydroxy-4'-methyl-pentanoate with acetic anhydride and recovering said desired testosterone ester from the reaction mixture.
5. The process of preparing testosterone 2'-acetoxy-4'-methyl-pentanoate which comprises treating testosterone 2'-hydroxy-4'-methyl-pentanoate with acetic anhydride at room temperature in the presence of an acid acceptor and recovering said desired testosterone ester from the reaction mixture.
6. The process of preparing testosterone 2'-acetoxy-4'-methyl-pentanoate which comprises acetylating testosterone 2'-hydroxy-4'-methyl pentanoate by treating said compound with acetic anhydride in the presence of pyridine.

References Cited in the file of this patent

FOREIGN PATENTS 660,199   Great Britain _____ Oct. 13, 1951

OTHER REFERENCES

Gould et al.: "Long Acting Testosterone Esters," J. Am. Chem. Soc., vol. 79 (August 20, 1957), pages 4472–75.